United States Patent
Earnshaw et al.

(10) Patent No.: US 10,397,026 B2
(45) Date of Patent: Aug. 27, 2019

(54) SAMPLING CLOCK ALIGNMENT AND TIME OFFSET SIGNALING FOR SYMBOL-ALIGNED FRAMES

(71) Applicant: One Media LLC, Hunt Valley, MD (US)

(72) Inventors: Mark Earnshaw, Kanata (CA); John Stewart, Arlington, VA (US)

(73) Assignee: One Media, LLC, Hunt Valley, MD (US)

( * ) Notice: Subject to any disclaimer, the term of this patent is extended or adjusted under 35 U.S.C. 154(b) by 97 days.

(21) Appl. No.: 15/344,247

(22) Filed: Nov. 4, 2016

(65) Prior Publication Data

US 2017/0126441 A1 May 4, 2017

Related U.S. Application Data

(60) Provisional application No. 62/261,126, filed on Nov. 30, 2015, provisional application No. 62/250,545, filed on Nov. 4, 2015.

(51) Int. Cl.
*H04L 25/03* (2006.01)
*H04H 60/29* (2008.01)
*H04L 27/26* (2006.01)

(52) U.S. Cl.
CPC ....... *H04L 25/03019* (2013.01); *H04H 60/29* (2013.01); *H04L 27/2602* (2013.01);
(Continued)

(58) Field of Classification Search
CPC ............. H04L 25/03019; H04L 27/263; H04L 27/2601; H04L 27/2656; H04L 27/2602;
(Continued)

(56) References Cited

U.S. PATENT DOCUMENTS

2002/0013135 A1* 1/2002 Proctor, Jr. ........... H04L 1/0001
455/228
2005/0026637 A1* 2/2005 Fischer ............. H04W 72/1215
455/502
(Continued)

FOREIGN PATENT DOCUMENTS

EP      2 151 945 A2    2/2010
WO  WO 2016/129974 A1  8/2016

OTHER PUBLICATIONS

International Search Report and Written Opinion, PCT International Application No. PCT/US2016/060687, filed Nov. 4, 2016, 16 pages, dated Feb. 1, 2017.
(Continued)

*Primary Examiner* — Jung Liu
(74) *Attorney, Agent, or Firm* — Sterne, Kessler, Goldstein & Fox P.L.L.C.

(57) ABSTRACT

Systems and methods for sampling clock alignment and time offset signaling are disclosed herein. A transmitter broadcasting symbol-aligned frames at multiple baseband sampling rates can benefit from generating the frames to have durations that can be represented by an integer number of samples at two or more of the baseband sampling rates. In some embodiments, a transmitter adds samples to a frame to ensure that its duration meets such a criteria. Furthermore, the problem of signaling network time in symbol-aligned frames is simplified by sampling clock alignment. Approaches for signaling time offset of a transmission to the nearest millisecond boundary are also presented.

19 Claims, 13 Drawing Sheets

(52) U.S. Cl.
CPC ........ *H04L 27/263* (2013.01); *H04L 27/2605* (2013.01); *H04L 27/2656* (2013.01); *H04L 27/2601* (2013.01)

(58) Field of Classification Search
CPC ........... H04L 27/2605; H04L 25/03834; H04L 27/2607; H04L 27/2626; H04H 60/29; H04Q 7/24
See application file for complete search history.

(56) References Cited

U.S. PATENT DOCUMENTS

| | | | | |
|---|---|---|---|---|
| 2005/0270969 | A1* | 12/2005 | Han | H04B 7/2621 370/210 |
| 2008/0002645 | A1* | 1/2008 | Seki | H04L 25/03834 370/338 |
| 2009/0122771 | A1* | 5/2009 | Cai | H04J 11/00 370/338 |
| 2009/0245422 | A1* | 10/2009 | Sampath | H04L 27/2628 375/302 |
| 2015/0312078 | A1* | 10/2015 | Bogdan | H04L 7/0087 375/226 |
| 2016/0212626 | A1 | 7/2016 | Simon et al. | |

OTHER PUBLICATIONS

Chu, C.-W. et al., "Design of an OFDMA Baseband Receiver for 3GPP Long-Term Evolution," *IEEE International Symposium VLSI Design, Automation and Test*, VLSI-DAT 2008, Piscataway, NJ, USA, pp. 196-199 (Apr. 23, 2008).

Earnshaw, M., "ATSC 3.0 Physical Layer Overview," 2016 ATSC Broadcast Conference, retrieved from the Internet: URL:http://atsc.org/pdf/conference/ATSC%203.0-Physical%Layer%Overview.pdf, 45 pages (Dated Oct. 29, 2014).

* cited by examiner

| Syntax | # of bits | Format |
|---|---|---|
| L1_Basic_signaling() { | | |
|     L1B_content_tag | 2 | uimsbf |
|     ... | | |
|     L1B_frame_length_mode | 1 | uimsbf |
|     if (L1B_frame_length_mode = 0) { | | |
|         L1B_frame_length | 10 | uimsbf |
|         L1B_excess_samples_per_symbol | 13 | uimsbf |
|     } else { | | |
|         L1B_time_offset | 16 | uimsbf |
|         L1B_additional_samples | 7 | uimsbf |
|     } | | |
|     L1B_num_subframes | 8 | uimsbf |
|     ... | | |
|     L1B_crc | 32 | uimsbf |
| } | | |

1400

| Syntax | # of bits | Format |
|---|---|---|
| L1_Basic_signaling() { | | |
|     L1B_content_tag | 2 | uimsbf |
|     ... | | |
|     L1B_frame_length_mode | 1 | uimsbf |
|     *if (L1B_frame_length_mode = 0) {* | | |
|         L1B_frame_length | 10 | uimsbf |
|     *} else {* | | |
|         *L1B_time_offset_msb* | *10* | *uimsbf* |
|     *}* | | |
|     L1B_num_subframes | 8 | uimsbf |
|     ... | | |
|     L1B_First_Sub_guard_interval | 4 | uimsbf |
|     *if (L1B_frame_length_mode = 0) {* | | |
|         L1B_First_Sub_excess_samples | 13 | uimsbf |
|     *} else {* | | |
|         *L1B_time_offset_lsb* | *6* | *uimsbf* |
|         *L1B_additional_samples* | *7* | *uimsbf* |
|     *}* | | |
|     L1B_First_Sub_num_ofdm_symbols | 11 | uimsbf |
|     ... | | |
|     L1B_crc | 32 | uimsbf |
| } | | |

| N' | Prime Factors | N' | Prime Factors | N' | Prime Factors |
|---|---|---|---|---|---|
| 16 | $2^4$ | 43 | 43 | 70 | 2x5x7 |
| 17 | 17 | 44 | $2^2$x11 | 71 | 71 |
| 18 | 2x$3^2$ | 45 | $3^2$x5 | 72 | $2^3$x$3^2$ |
| 19 | 19 | 46 | 2x23 | 73 | 73 |
| 20 | $2^2$x5 | 47 | 47 | 74 | 2x37 |
| 21 | 3x7 | 48 | $2^4$x3 | 75 | 3x$5^2$ |
| 22 | 2x11 | 49 | $7^2$ | 76 | $2^2$x19 |
| 23 | 23 | 50 | 2x$5^2$ | 77 | 7x11 |
| 24 | $2^3$x3 | 51 | 3x17 | 78 | 2x3x13 |
| 25 | $5^2$ | 52 | $2^2$x13 | 79 | 79 |
| 26 | 2x13 | 53 | 53 | 80 | $2^4$x5 |
| 27 | $3^3$ | 54 | 2x$3^3$ | 81 | $3^4$ |
| 28 | $2^2$x7 | 55 | 5x11 | 82 | 2x41 |
| 29 | 29 | 56 | $2^3$x7 | 83 | 83 |
| 30 | 2x3x5 | 57 | 3x19 | 84 | $2^2$x3x7 |
| 31 | 31 | 58 | 2x29 | 85 | 5x19 |
| 32 | $2^5$ | 59 | 59 | 86 | 2x43 |
| 33 | 3x11 | 60 | $2^2$x3x5 | 87 | 3x29 |
| 34 | 2x17 | 61 | 61 | 88 | $2^3$x11 |
| 35 | 5x7 | 62 | 2x31 | 89 | 89 |
| 36 | $2^2$x$3^2$ | 63 | $3^2$x7 | 90 | 2x$3^2$x5 |
| 37 | 37 | 64 | $2^6$ | 91 | 7x13 |
| 38 | 2x19 | 65 | 5x13 | 92 | $2^2$x23 |
| 39 | 3x13 | 66 | 2x3x11 | 93 | 3x31 |
| 40 | $2^3$x5 | 67 | 67 | 94 | 2x47 |
| 41 | 41 | 68 | $2^2$x17 | 95 | 5x19 |
| 42 | 2x3x7 | 69 | 3x23 | 96 | $2^5$x3 |

FIG. 15

| $N'$ | $M_1$ | $M_2$ | Prime Factors | $N'$ | $M_1$ | $M_2$ | Prime Factors | $N'$ | $M_1$ | $M_2$ | Prime Factors |
|---|---|---|---|---|---|---|---|---|---|---|---|
| 16 | ✓ | ✓ | $2^4$ | 43 | | | 43 | 70 | ✓ | ✓ | 2x5x7 |
| 17 | | | 17 | 44 | | ✓ | $2^2$x11 | 71 | | | 71 |
| 18 | ✓ | ✓ | 2x$3^2$ | 45 | ✓ | ✓ | $3^2$x5 | 72 | ✓ | ✓ | $2^3$x$3^2$ |
| 19 | | | 19 | 46 | | | 2x23 | 73 | | | 73 |
| 20 | ✓ | ✓ | $2^2$x5 | 47 | | | 47 | 74 | | | 2x37 |
| 21 | ✓ | ✓ | 3x7 | 48 | ✓ | ✓ | $2^4$x3 | 75 | | ✓ | 3x$5^2$ |
| 22 | | ✓ | 2x11 | 49 | | | $7^2$ | 76 | | | $2^2$x19 |
| 23 | | | 23 | 50 | | ✓ | 2x$5^2$ | 77 | | ✓ | 7x11 |
| 24 | ✓ | ✓ | $2^3$x3 | 51 | | | 3x17 | 78 | | | 2x3x13 |
| 25 | | ✓ | $5^2$ | 52 | | | $2^2$x13 | 79 | | | 79 |
| 26 | | | 2x13 | 53 | | | 53 | 80 | ✓ | ✓ | $2^4$x5 |
| 27 | | | $3^3$ | 54 | | | 2x$3^3$ | 81 | | | $3^4$ |
| 28 | ✓ | ✓ | $2^2$x7 | 55 | | ✓ | 5x11 | 82 | | | 2x41 |
| 29 | | | 29 | 56 | ✓ | ✓ | $2^3$x7 | 83 | | | 83 |
| 30 | ✓ | ✓ | 2x3x5 | 57 | | | 3x19 | 84 | ✓ | ✓ | $2^2$x3x7 |
| 31 | | | 31 | 58 | | | 2x29 | 85 | | | 5x19 |
| 32 | ✓ | ✓ | $2^5$ | 59 | | | 59 | 86 | | | 2x43 |
| 33 | | ✓ | 3x11 | 60 | ✓ | ✓ | $2^2$x3x5 | 87 | | | 3x29 |
| 34 | | | 2x17 | 61 | | | 61 | 88 | | ✓ | $2^3$x11 |
| 35 | ✓ | ✓ | 5x7 | 62 | | | 2x31 | 89 | | | 89 |
| 36 | ✓ | ✓ | $2^2$x$3^2$ | 63 | ✓ | ✓ | $3^2$x7 | 90 | ✓ | ✓ | 2x$3^2$x5 |
| 37 | | | 37 | 64 | | ✓ | $2^6$ | 91 | | | 7x13 |
| 38 | | | 2x19 | 65 | | | 5x13 | 92 | | | $2^2$x23 |
| 39 | | | 3x13 | 66 | | ✓ | 2x3x11 | 93 | | | 3x31 |
| 40 | ✓ | ✓ | $2^3$x5 | 67 | | | 67 | 94 | | | 2x47 |
| 41 | | | 41 | 68 | | | $2^2$x17 | 95 | | | 5x19 |
| 42 | ✓ | ✓ | 2x3x7 | 69 | | | 3x23 | 96 | ✓ | ✓ | $2^5$x3 |

| $N'$ | BSR (MHz) | $T_s = 1 / BSR$ (µs) | $(64 \times T_s) / T_{basic,1}$ |
|---|---|---|---|
| 16 | 6.144 | 0.16276 | 630 |
| 18 | 6.912 | 0.14468 | 560 |
| 20 | 7.680 | 0.13021 | 504 |
| 21 | 8.064 | 0.12401 | 480 |
| 24 | 9.216 | 0.10851 | 420 |
| 28 | 10.752 | 0.093006 | 360 |
| 30 | 11.520 | 0.086806 | 336 |
| 32 | 12.288 | 0.081380 | 315 |
| 35 | 13.440 | 0.074405 | 288 |
| 36 | 13.824 | 0.072338 | 280 |
| 40 | 15.360 | 0.065104 | 252 |
| 42 | 16.128 | 0.062004 | 240 |
| 45 | 17.280 | 0.057870 | 224 |
| 48 | 18.432 | 0.054253 | 210 |
| 56 | 21.504 | 0.046503 | 180 |
| 60 | 23.040 | 0.043403 | 168 |
| 63 | 24.192 | 0.041336 | 160 |
| 70 | 26.880 | 0.037202 | 144 |
| 72 | 27.648 | 0.036169 | 140 |
| 80 | 30.720 | 0.032552 | 126 |
| 84 | 32.256 | 0.031002 | 120 |
| 90 | 34.560 | 0.028935 | 112 |
| 96 | 36.864 | 0.027127 | 105 |

FIG. 17

| N' | BSR (MHz) | $T_s = 1 / BSR$ (µs) | $(64 \times T_s) / T_{basic,2}$ | 1800 |
|---|---|---|---|---|
| 16 | 6.144 | 0.16276 | 69300 | |
| 18 | 6.912 | 0.14468 | 61600 | |
| 20 | 7.680 | 0.13021 | 55400 | |
| 21 | 8.064 | 0.12401 | 52800 | |
| 22 | 8.448 | 0.11837 | 50400 | |
| 24 | 9.216 | 0.10851 | 46200 | |
| 25 | 9.600 | 0.10417 | 44352 | |
| 28 | 10.752 | 0.093006 | 39600 | |
| 30 | 11.520 | 0.086806 | 36960 | |
| 32 | 12.288 | 0.081380 | 34650 | |
| 33 | 12.672 | 0.078914 | 33600 | |
| 35 | 13.440 | 0.074405 | 31680 | |
| 36 | 13.824 | 0.072338 | 30800 | |
| 40 | 15.360 | 0.065104 | 27720 | |
| 42 | 16.128 | 0.062004 | 26400 | |
| 44 | 16.896 | 0.059186 | 25200 | |
| 45 | 17.280 | 0.057870 | 24640 | |
| 48 | 18.432 | 0.054253 | 23100 | |
| 50 | 19.200 | 0.052083 | 22176 | |
| 55 | 21.120 | 0.047348 | 20160 | |
| 56 | 21.504 | 0.046503 | 19800 | |
| 60 | 23.040 | 0.043403 | 18480 | |
| 63 | 24.192 | 0.041336 | 17600 | |
| 64 | 24.576 | 0.040690 | 17325 | |
| 66 | 25.344 | 0.039457 | 16800 | |
| 70 | 26.880 | 0.037202 | 15840 | |
| 72 | 27.648 | 0.036169 | 15400 | |
| 75 | 28.800 | 0.034722 | 14784 | |
| 77 | 29.568 | 0.033820 | 14400 | |
| 80 | 30.720 | 0.032552 | 13860 | |
| 84 | 32.256 | 0.031002 | 13200 | |
| 88 | 33.792 | 0.029593 | 12600 | |
| 90 | 34.560 | 0.028935 | 12320 | |
| 96 | 36.864 | 0.027127 | 11550 | |

| Syntax | # of bits | | Format |
|---|---|---|---|
| | $T_{basic,1}$ | $T_{basic,2}$ | |
| L1_Basic_signaling() { | | | |
|     L1B_content_tag | 2 | | uimsbf |
|     ... | | | |
|     L1B_frame_length_mode | 1 | | uimsbf |
|     if (L1B_frame_length_mode = 0) { | | | |
|         L1B_frame_length | 10 | | uimsbf |
|     } else { | | | |
|         L1B_time_offset_lsb | 10 | | uimsbf |
|     } | | | |
|     L1B_num_subframes | 8 | | uimsbf |
|     ... | | | |
|     L1B_First_Sub_guard_interval | 4 | | uimsbf |
|     if (L1B_frame_length_mode = 0) { | | | |
|         L1B_First_Sub_excess_samples | 13 | | uimsbf |
|     } else { | | | |
|         L1B_time_offset_msb | 6 | 13 | uimsbf |
|         L1B_unused_bits | 7 | 0 | uimsbf |
|     } | | | |
|     L1B_First_Sub_num_ofdm_symbols | 11 | | uimsbf |
|     ... | | | |
|     L1B_crc | 32 | | uimsbf |
| } | | | |

FIG. 19

SAMPLING CLOCK ALIGNMENT AND TIME OFFSET SIGNALING FOR SYMBOL-ALIGNED FRAMES

CROSS-REFERENCE TO RELATED APPLICATIONS

This application claims priority under 35 U.S.C. 119(e) to U.S. Provisional Patent Application No. 62/261,126 filed on Nov. 30, 2015, and U.S. Provisional Patent Application No. 62/250,545 filed on Nov. 4, 2015, both of which are incorporated by reference herein in their entireties.

BACKGROUND

Field

The present disclosure relates to communications systems, including systems having variable sample rates or symbol-aligned frames.

Related Art

Wireless communication systems utilize radio frequencies (RF) of the electromagnetic spectrum to communicate over a distance without wires. RF signals can often reach a wireless receiver even when there is no direct line of sight between the transmitter and receiver.

A wireless signal can take multiple paths between a transmitter and a receiver due to reflections off of objects in the environment. The reflections, while enabling non-line of sight communication, can also restrict how fast a transmitter can communicate with a receiver. Specifically, if the signal takes two paths, one of which is much longer than the other, the second path is essentially an echo that interferes with subsequent transmissions. High-rate signals, where symbols are transmitted in quick succession, are most susceptible to this interference, which is sometimes called inter-symbol interference. This interference can limit the bandwidth of a wireless channel.

A receiver can compensate for inter-symbol interference by processing the received signal to remove the effects of the echoes. This process is known as equalization. Moreover, a transmitter can shape its transmitted signal to simplify the receiver's task of equalization. One such technique is called orthogonal frequency division multiplexing, or OFDM. In this technique, the transmitted signal includes a number of low-rate signals transmitted simultaneously on orthogonal carrier frequencies, and consecutive symbols on the same signal have a guard interval or cyclic prefix between them. Because each individual signal has a low transmission rate and has a guard interval between consecutive symbols, the signal does not suffer from inter-symbol interference. Furthermore, because the transmitter sends a number of these low-rate signals simultaneously, a high data rate can be achieved. These advantages have led to OFDM being adopted in many major wireless standards, including 3GPP LTE, WiFi, and the Advanced Television Systems Committee (ATSC) 3.0.

OFDM signals can be tuned to target various scenarios, such as high-mobility, low-mobility, fixed access, long-range, and short-range applications. These parameters are typically fixed for an application. For example, the LTE OFDM waveform, which is designed for medium-range, high-mobility applications, uses different parameters than the WiFi OFDM waveform, which is designed for short-range low-mobility applications.

ATSC 3.0, which uses spectrum devoted to broadcast transmissions, has the potential to serve many diverse scenarios ranging from conventional fixed access long-range to highly mobile medium-range applications. For example, ATSC 3.0 broadcasts could target a smartphone on a train and a television set inside a house. For this reason, ATSC 3.0 has adopted a flexible waveform with parameters that can be configured to target different audiences.

One parameter that can be varied in ATSC 3.0 is the baseband sampling rate (BSR). It is envisioned that future versions of ATSC will support different BSRs for successive frames. In this way, an ATSC transmitter will be able to alternately serve users with different receiver capabilities. For example, relative to a conventional digital television receiver, a smartphone may utilize a lower sampling rate to decode future ATSC signals in order to conserve battery life. Moreover, receiving the highest-resolution television signals on a smartphone may not be efficient given the limited screen size of portable devices.

ATSC 3.0 will not support variable-BSR transmission within a given band. However, signaling to support variable-BSR transmission in future versions of ATSC is needed at the present time to support envisioned applications for variable-BSR ATSC.

SUMMARY

Some embodiments relate to sampling clock alignment in variable-BSR transmissions using symbol-aligned frames. In some embodiments, a number of samples can be added to the end of a frame such that the duration of the frame can be represented by an integer number of samples sampled at any one of two or more different sample rates. In some embodiments, the extra samples may take the form of a cyclic postfix on the last OFDM symbol of a frame.

Some embodiments relate to time offset signaling in variable-BSR transmissions using symbol-aligned frames. In some embodiments, network time as of the beginning of a frame is signaled in units of milliseconds, and time offset signaling enables sub-millisecond precision for symbol-aligned frames that may not begin on a millisecond boundary. In some embodiments, time offset signaling can be performed in conjunction with sampling clock alignment, allowing the assumption that the time offset between a millisecond boundary and the beginning of a frame is an integer number of samples. In other embodiments, time offset signaling is performed without sampling clock alignment, and is based on prime factorization to select a subset of possible BSRs.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIG. 14 illustrates a second example of a signaling field to support time offset and sampling clock alignment according to some embodiments of the disclosure.

FIG. 15 illustrates the prime factors of the integers ranging from 16 to 96.

FIG. 16 illustrates the BSR indicators N' that can be represented using subsets of the prime factors $M_1$ and $M_2$.

FIG. 17 illustrates representations of $64 \times T_S$ as an integer multiple of $T_{basic,1}$ for different N'.

FIG. 18 illustrates representations of $64 \times T_S$ as an integer multiple of $T_{basic,2}$ for different N'.

FIG. 19 illustrates a signaling field to support time offset based on prime factor expansion according to some embodiments of the disclosure.

Figure 1:
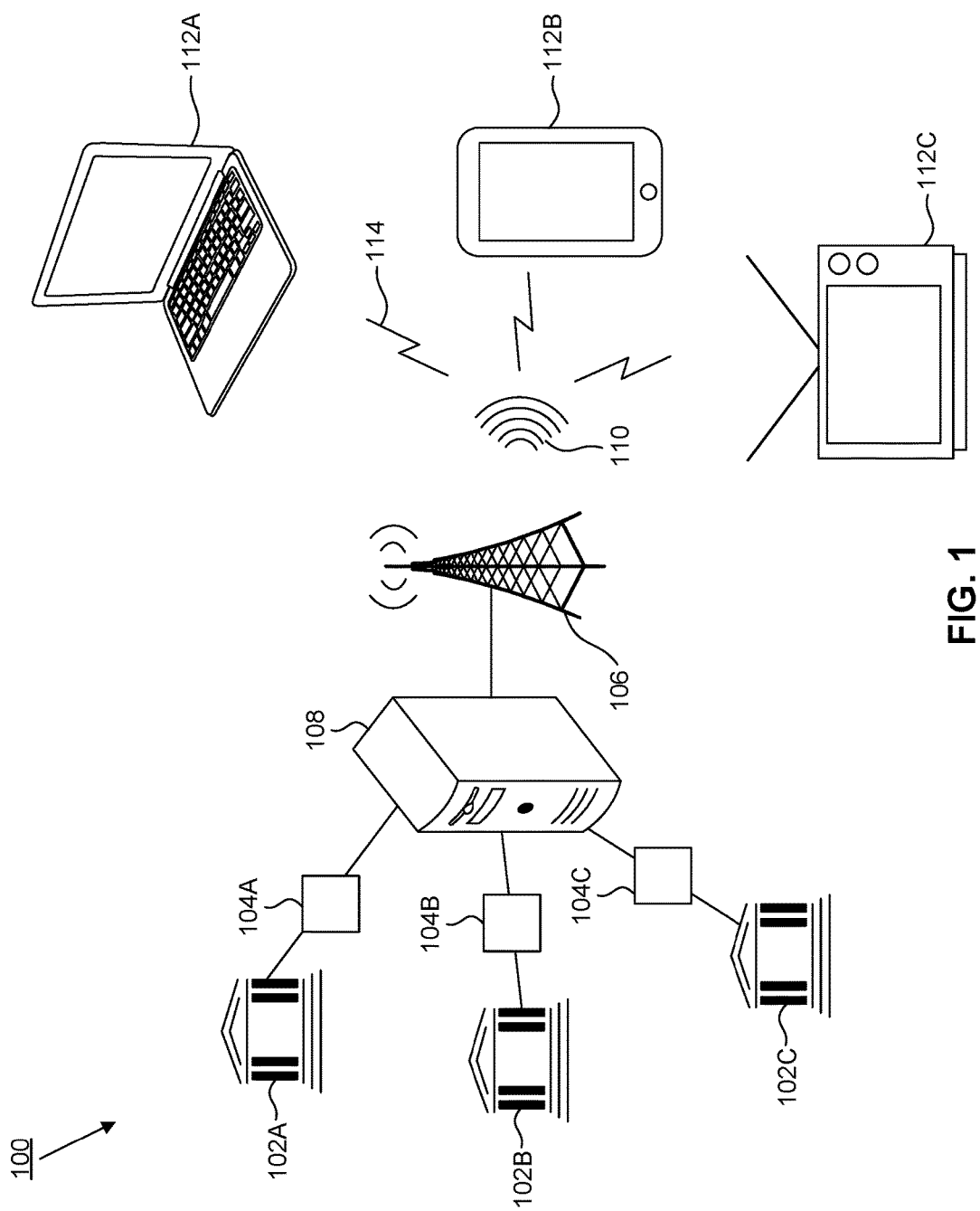
FIG. 1 illustrates a broadcast network according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

It should be appreciated that the following acronyms and abbreviations may be used herein:
ATSC Advanced Television Systems Committee
BSR Baseband Sampling Rate
CP Cyclic Prefix
FFT Fast Fourier Transform
GI Guard Interval
GIL Guard Interval Length
GPS Global Positioning System
lsb Least significant bit(s)
MHz MegaHertz
ms millisecond
msb Most significant bit(s)
µs microsecond
OFDM Orthogonal Frequency Division Multiplexing
PLP Physical Layer Pipe
RF Radio Frequency
uimsbf unsigned integer most significant bit first FIG. 1 illustrates an example broadcast network communications system 100 including a plurality of content providers 102A, 102B, and 102C (hereinafter content providers 102) providing a variety of types of content 104A, 104B, and 104C (hereinafter content 104) via a broadcast network 106. It should be appreciated that although three content providers 102 are illustrated, system 100 may include any suitable number of content providers 102. In addition, content providers 102 may be providers of any suitable types of content, such as television broadcast signals, software updates, emergency alerts, and so on. It should be further appreciated that the content providers 102 may provide content 104 via either a wireless or wired connection to a gateway 108.

The content 104 is time-multiplexed, at the gateway 108, into a single RF channel 110. The broadcast receivers 112A, 112B, and 112C (hereinafter broadcast receivers 112) are configured to identify and receive the broadcast signals 114 via the RF channel 110. It should be appreciated that although here different types of broadcast receivers 112 are illustrated (a laptop computer 112A, a smartphone 112B, and a television 112C), system 100 may include any suitable number and type of broadcast receivers 112.

The content 104 can include frames having different BSRs within the single RF channel 110. For example, an emergency alert can be transmitted at a low BSR that is receivable by an inexpensive and power-efficient receiver such as may be included into smartphone 112B. A television broadcast signal, conversely, can be transmitted at a high BSR that is receivable by a high-power receiver such as may be included into television 112C.

Figure 7:
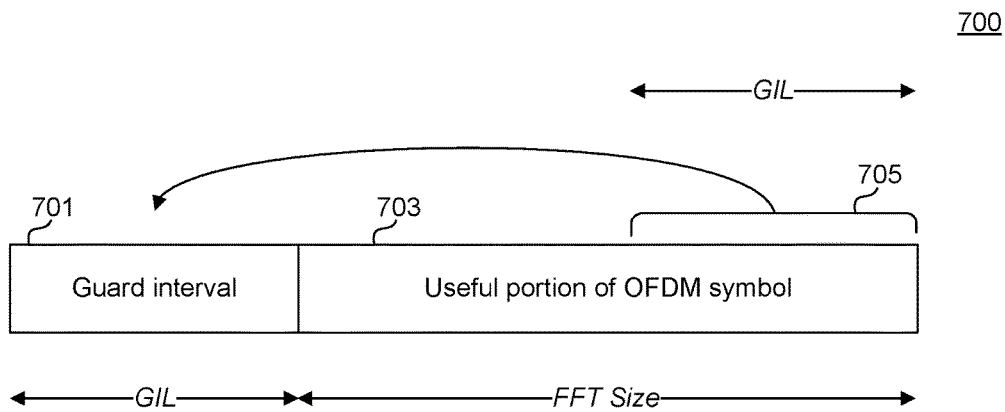
FIG. 7 illustrates an OFDM symbol in the time domain according to some embodiments of the disclosure.

FIG. 7 illustrates an OFDM symbol 700 in the time domain according to some embodiments of the disclosure. The OFDM symbol 700 comprises a guard interval 701 and a useful portion 703. In some embodiments, the guard interval 701 precedes the useful portion 703 of the OFDM symbol 700. In some embodiments, the guard interval 701 is a copy of a last segment 705 of the useful portion 703 of the OFDM symbol 700 and is also known as a cyclic prefix. The length of the guard interval 701 is denoted as GIL. The guard interval 701 serves as a buffer between OFDM symbols to ensure that one OFDM symbol is not affected by inter-symbol interference from immediately adjacent OFDM symbols. Thus, the GIL should exceed the maximum expected delay spread of the channel.

A receiver typically operates on the useful portion 703 of the OFDM symbol 700, which contains a number of samples equal to the Fast Fourier Transform (FFT) size of the waveform. The receiver can perform an FFT on these samples to convert them to the frequency domain. The receiver can then perform further receiver processing, including equalization, demodulation, and decoding, to determine the transmitted data.

In some embodiments, the FFT size and/or GIL can be varied to target transmissions to different receivers. For example, it may be desirable to adjust the subcarrier spacing to provide different Doppler tolerances for different targeted receivers. For example, mobile receivers require a high Doppler tolerance and thus require a large subcarrier spacing. Conversely, fixed receivers can receive OFDM symbols having a low Doppler tolerance and can therefore handle a smaller subcarrier spacing. The subcarrier spacing $\Delta_f$ can be calculated as $\Delta_f = BSR/N_{FFT}$, where $N_{FFT}$ is the FFT size. One way of varying subcarrier spacing is to vary the FFT size. However, FFT sizes are usually powers of 2, placing a practical limit on the number of useful FFT sizes. ATSC 3.0, in some embodiments, includes three FFT sizes: 8192, 16384, and 32768. Thus, varying the subcarrier spacing by varying FFT size results in only coarse granularity in the subcarrier spacing. Accordingly, in some embodiments it may be desirable to vary the BSR and thereby provide finer granularity in the variation of subcarrier spacing.

Figure 2:
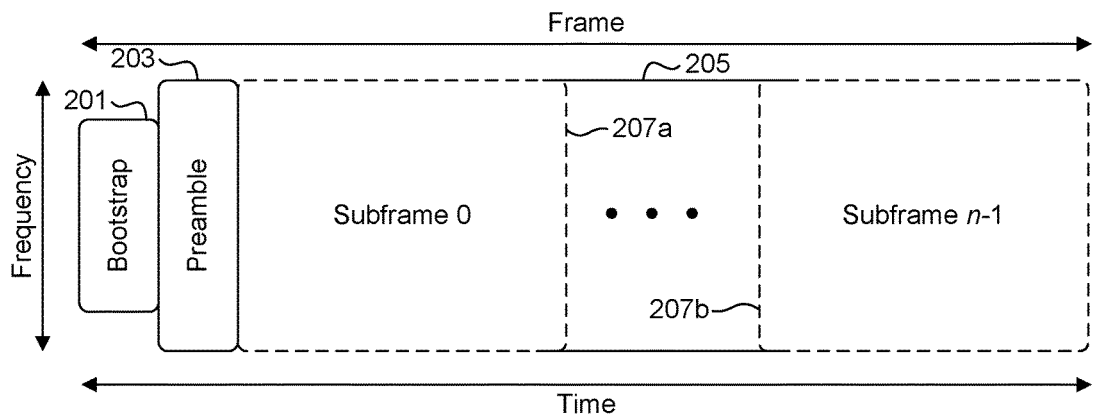
FIG. 2 illustrates a physical layer frame structure according to some embodiments of the disclosure.

FIG. 2 illustrates an example physical layer frame structure 200. The vertical axis of FIG. 2 illustrates the frequency domain, whereas the horizontal axis illustrates the time domain. In some embodiments, each frame 200 begins with a bootstrap signal 201. The bootstrap 201 can provide a receiver with information as to the nature and content of the frame 200, allowing receivers to skip decoding of the frame 200 if the receiver is not capable of or is not interested in decoding its content. In some embodiments, the bootstrap 201 is transmitted with a fixed BSR that does not vary between frames. The bootstrap 201 may comprise a number of bootstrap symbols, each containing 3072 time samples and having a duration of 0.5 ms. In an embodiment, the bootstrap 201 comprises four bootstrap symbols. The ATSC 3.0 A/321 standard includes a bootstrap 201, the details of which are hereby incorporated by reference.

In some embodiments, a preamble 203 follows the bootstrap 201. The bootstrap 201 and the preamble 203 can provide a receiver with further information as to the transmission parameters of the payload signal 205 that follows, and which the receiver ultimately wishes to decode. For example, the BSR of the payload 205 can be signaled in the bootstrap 201, and the preamble 203 can signal the FFT size and GIL used for the payload 205. The preamble 203 itself comprises one or more OFDM symbols, each having a configured FFT size (e.g. 8192, 16384, 32768) and a guard interval length to mitigate inter-symbol interference.

In some embodiments, the payload 205 follows the preamble 203. The payload 205 may be divided into subframes 207a-207b as illustrated in FIG. 2. Each subframe 207a-207b of the payload 205 may be transmitted with the same BSR such that the payload 205 can be said to have a single BSR. The payload 205 comprises one or more OFDM symbols having a configured FFT size and guard interval length. The FFT size and guard interval length for each of the preamble and subframes within a frame can be configured independently. That is, different subframes 207a-207b within the same frame may be configured with either the same or different FFT sizes and/or guard interval lengths, and the FFT size and guard interval length used for the frame's preamble 203 may be the same as or different from those used for any of the subframes 207a-207b contained within the same frame.

Each portion of the frame 200 in the illustrated embodiment has a baseband sampling rate (BSR) associated with it, which may indicate the rate at which baseband time samples are produced for that portion of the transmitted waveform. In some embodiments according to the ATSC 3.0 standard, baseband sampling rates are derived as integer multiples of the same root rate according to the following equation $$BSR = 0.384 \times N' \text{ MHz}$$

where N' is an integer in the range $16 \leq N' \leq 96$. For the ATSC 3.0 bootstrap, in some embodiments, N'=16 and BSR=6.144 MHz. The BSR for the remainder of each frame (e.g., the preamble 203 and the payload 205 portions) can be signaled in the bootstrap via a value $N = N' - 16$, where $0 \leq N \leq 80$.

In some embodiments, the possible sample rates are a subset of the above equation for BSR. For example, in ATSC 3.0, there are only three valid values of N: $N \in \{2,5,8\}$. Specifically, N=2 for an RF channel bandwidth of 6 MHz, resulting in BSR=6.912 MHz; N=5 for an RF channel bandwidth of 7 MHz, resulting in BSR=8.064 MHz; and N=8 for an RF channel bandwidth of 8 MHz, resulting in BSR=9.216 MHz. In other embodiments, there are 81 possible BSRs, as previously described.

Figure 3:
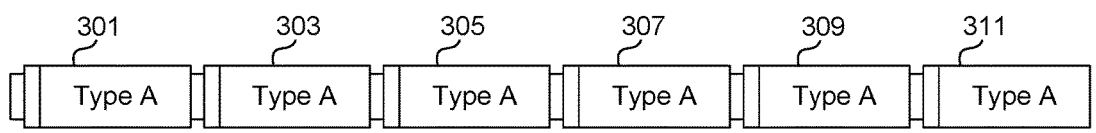
FIG. 3 illustrates time-multiplexing of physical layer frames having the same type according to some embodiments of the disclosure.

FIG. 3 illustrates a transmission of multiple physical layer frames 301-311 having the same type using time-multiplexing in the same RF channel according to some embodiments of the disclosure. Frames 301-311 that have the same type can be transmitted with the same BSR. Frames 301-311 that have the same type may also have the same subframe configuration or version information.

Knowledge of frame boundaries can be important to receiver performance. As discussed relative to FIG. 2, the bootstrap contains information that allows a receiver to skip decoding the frame and wait until the next frame. In such an embodiment, the receiver would benefit from knowledge of when the next frame begins to avoid an exhaustive search for the next bootstrap. If the payload of the skipped frame is transmitted using a BSR supported by the receiver, then the receiver can be informed that the beginning of the next frame is an integer number of samples in the future.

Figure 4:
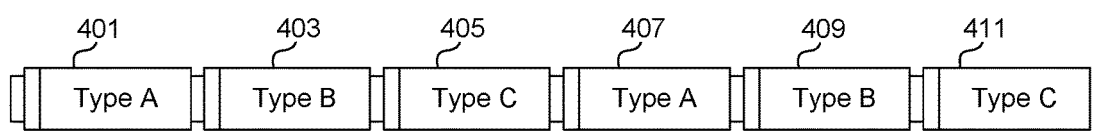
FIG. 4 illustrates time-multiplexing of physical layer frames of different types according to some embodiments of the disclosure.

FIG. 4 illustrates a transmission of multiple physical layer frames 401-411 having three different types using time-multiplexing in the same RF channel according to some embodiments of the disclosure. Frame types A, B, and C may be transmitted using three different BSRs. Frames 401-411 that have different types may also have different configurations or version information.

Knowledge of frame boundaries can be a challenge for receivers in a system employing multiple BSRs in a single RF channel. Part of the challenge is due to the fact that a frame comprising an integer number of samples at one BSR may not have a duration equal to the duration of a frame having a corresponding integer number of samples at a second BSR. For example, if a receiver is configured to receive Type A frame 401 with a certain BSR, and the transmitter transmits a Type B frame 403 with a different BSR, then the beginning of the next Type A frame 407 might occur between sampling clock cycles at the receiver, resulting in a sampling clock offset.

Figure 5:
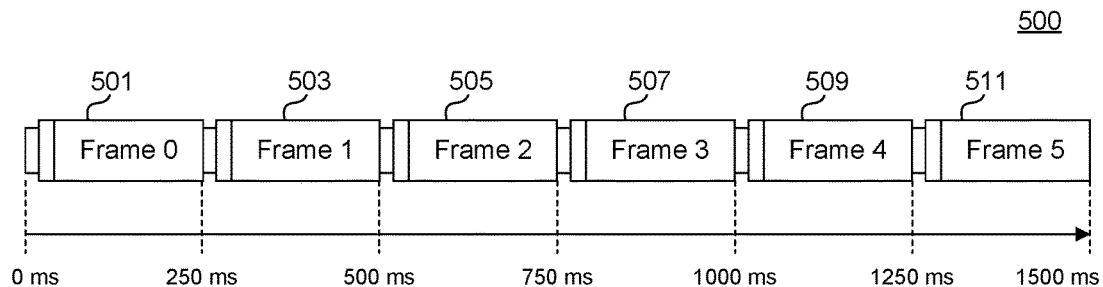
FIG. 5 illustrates a transmission with time-aligned frames according to some embodiments of the disclosure.

One solution to the problem of variable BSR is to use time-aligned frames. Specifically, in some embodiments, each frame 401-411 begins and ends on an integer millisecond boundary regardless of the sample rate. This solution is possible in systems where all BSR possibilities result in an integer number of samples in a millisecond. FIG. 5 illustrates a transmission with time-aligned frames 501-511 according to some embodiments of the disclosure. In the illustrated embodiment, each frame 501-511 is exactly 250 ms in duration, and the beginning and end of each frame 501-511 align exactly with a millisecond boundary. It should be appreciated that the relative durations of the bootstrap, preamble, and payload portions of each frame are not necessarily drawn to scale in FIG. 5.

Time-aligned frames can be formed by padding the frames with an integer number of samples. Specifically, in some embodiments, a data frame is generated, and a modified data frame is generated from the data frame by determining the number of extra time samples required to "pad" a physical layer frame out to the required total time length. The extra samples can be distributed equally to the guard intervals of each OFDM symbol within the payload portion of the frame. In some embodiments, the guard intervals of the OFDM symbols belonging to the preambles are not affected by padding. Any remaining extra time samples are used to create a cyclic postfix on the final OFDM symbol of the frame.

Figure 6:
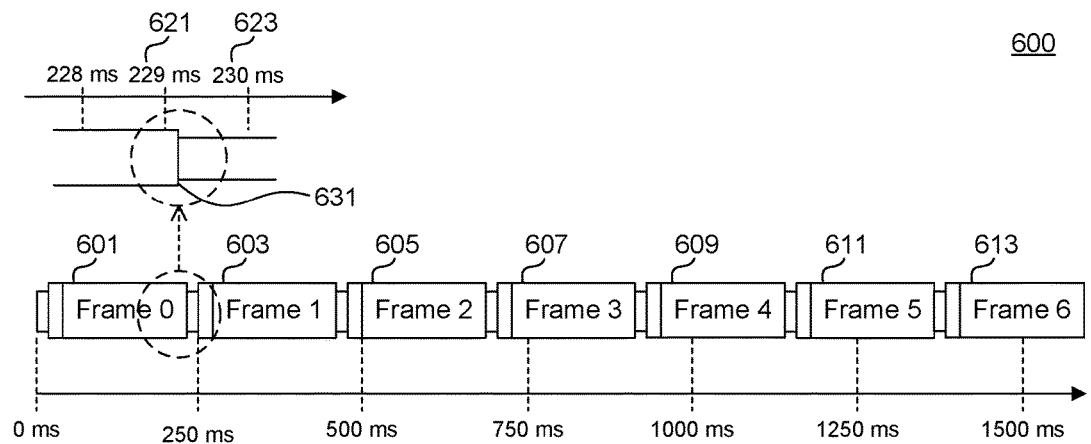
FIG. 6 illustrates a transmission with symbol-aligned frames according to some embodiments of the disclosure.

FIG. 6 illustrates a transmission 600 with symbol-aligned frames 601-613 according to some embodiments of the disclosure. The total time length of a symbol-aligned frame can vary from frame to frame and is equal to the total sum of the time lengths of the individual symbols (bootstrap symbols, preamble symbols, and payload symbols) belonging to that frame. Thus, unlike time-aligned frames, the frame boundaries for symbol-aligned frames may not correspond to millisecond boundaries.

In the illustrated embodiment, even though the beginning of Frame 0 (601) is aligned with a millisecond boundary at time 0 ms, the end 631 of Frame 0 (601) and beginning 631 of Frame 1 (603) are not aligned with a millisecond boundary, falling between the boundaries of the 229th ms (621) and the 230th ms (623) as shown in the inset. It should be appreciated that the relative time lengths of the bootstrap, preamble, and payload portions of each frame are not necessarily drawn to scale in FIG. 6.

Sampling Clock Alignment

Figure 8:
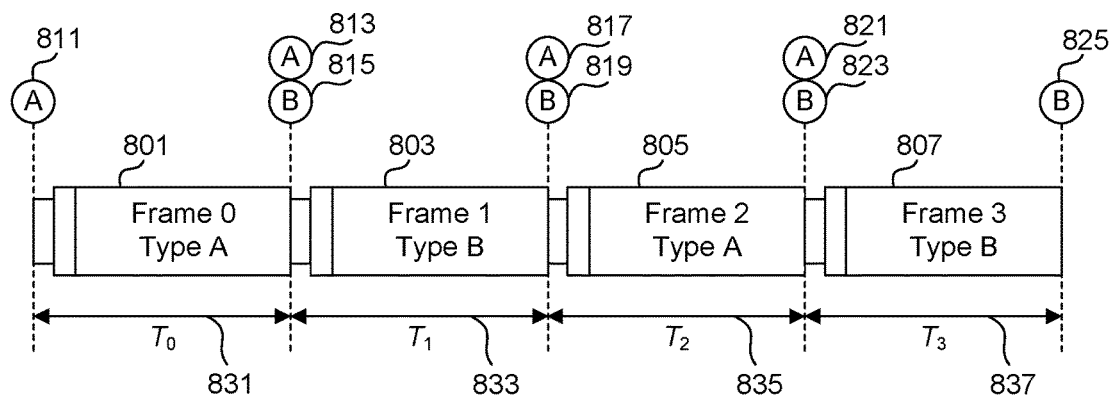
FIG. 8 illustrates a transmission with sampling clock alignment with symbol-aligned frames when each frame has a different sampling rate than the previous frame according to some embodiments of the disclosure.

FIG. 8 illustrates a transmission 800 with sampling clock alignment with symbol-aligned frames 801-807 when each frame 801-807 has a different sampling rate than the previous frame according to some embodiments of the disclosure. The illustrated embodiment includes two frame types, Type A and Type B, which are assumed to utilize two different BSRs. A goal of sampling clock alignment is to ensure that transmissions between BSR changes span a duration that can be represented by an integer number of samples under any of the possible BSRs.

In the illustrated embodiment, Frame 0 (801) is of Type A and has a duration $T_0$ (831). Duration $T_0$ 831 by definition can be represented by an integer number of Type A samples because it represents the duration of a Type A frame 801. Furthermore, because the next frame 803 is Type B and therefore uses a different BSR, receivers designed to receive Type B frames may benefit from duration $T_0$ 831 being aligned to an integer number of Type B samples as well. Sampling clock alignment aims to ensure that duration $T_0$ 831 can be represented by an integer number of samples for both Type A and Type B BSRs.

Similarly, in the illustrated embodiment, Frame 1 (803) is of Type B and has a duration $T_1$ (833). Duration $T_1$ 833 by definition can be represented by an integer number of Type B samples because it represents the duration of a Type B frame 803. Furthermore, because the next frame 805 is Type A and therefore uses a different BSR, receivers designed to receive Type B frames may benefit from duration $T_1$ 833 being aligned to an integer number of Type A samples as well. Sampling clock alignment aims to ensure that duration $T_1$ 833 can be represented by an integer number of samples for both Type A and Type B BSRs.

Figure 9:
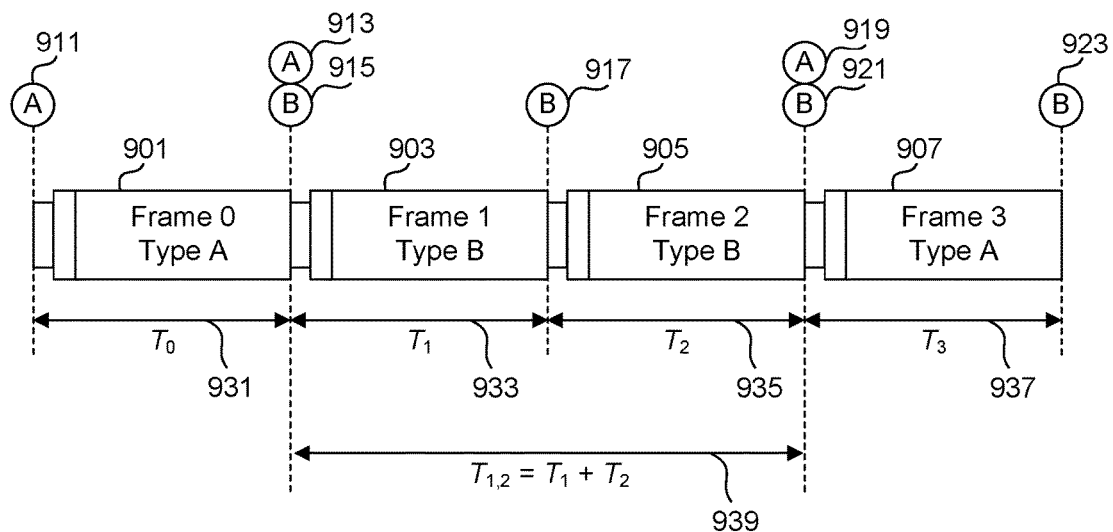
FIG. 9 illustrates a transmission with sampling clock alignment with symbol-aligned frames when two consecutive frames may have the same sampling rate according to some embodiments of the disclosure.

FIG. 9 illustrates a transmission 900 with sampling clock alignment with symbol-aligned frames 901-907 when two consecutive frames may have the same sampling rate according to some embodiments of the disclosure. Like FIG. 8, the illustrated embodiment includes two frame types, Type A and Type B, which are assumed to utilize two different BSRs. A difference between FIG. 8 and FIG. 9 is that FIG. 9 includes two consecutive Type B frames 903, 905 having duration $T_{1,2}=T_1+T_2$ (939). In this embodiment, $T_1$ 933, the duration of Frame 1 (903), does not need to be representable by an integer number of Type A samples because a receiver configured to receive Type A frames has no need to know when Frame 2 (905) (another Type B frame) begins. Rather, sampling clock alignment only needs to ensure that the total transmission time of consecutive Type B frames, $T_{1,2}=T_1+T_2$ 939, is representable by an integer number of Type A samples. In FIG. 9, each time point 911-923 labeled with a letter inside a circle illustrates a time point that is synchronized with the sampling clock described in the circle.

Recall from the above discussion of FIG. 2 that in some embodiments, $$BSR = 0.384 \times N' \text{ MHz} = 384 \times N' \times 10^3 \text{ samples per second}.$$

Figure 10:
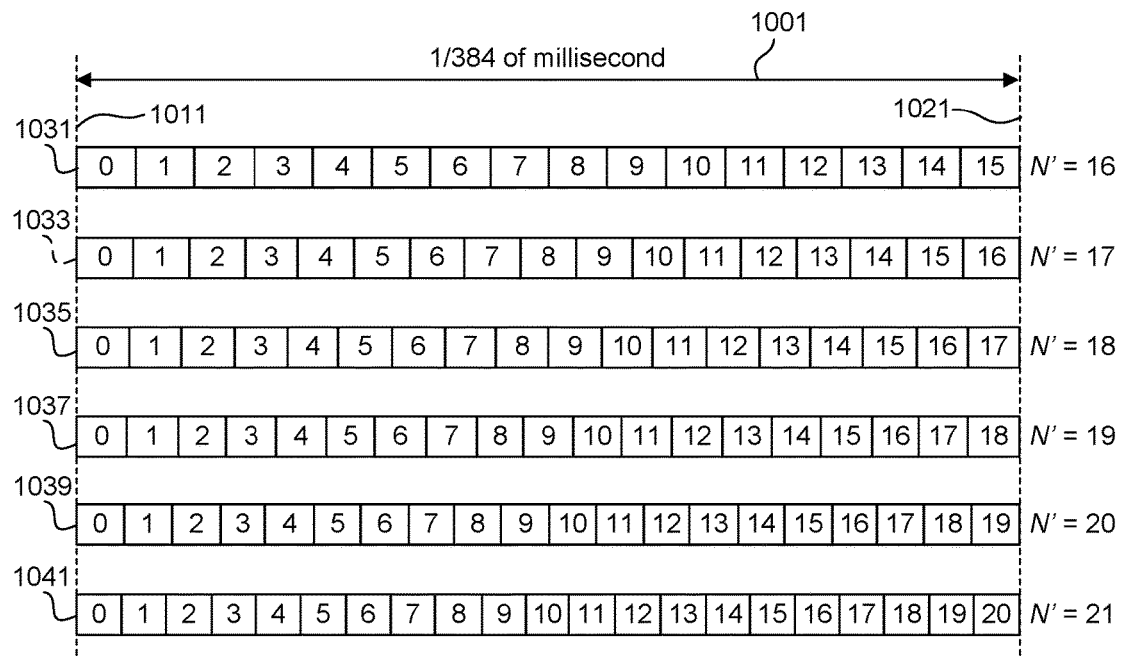
FIG. 10 illustrates the number of samples in 1/384th of a millisecond for different baseband sample rates according to some embodiments of the disclosure.

Thus, in 1 ms, or $10^{-3}$ seconds, $384 \times N'$ samples are transmitted in some embodiments. Furthermore, as shown in FIG. 10, N' samples are transmitted in 1/384 ms 1001 in these embodiments. FIG. 10 illustrates the number of samples in 1/384th of a millisecond for baseband sample rates varying from 16 (1031) to 21 (1041) according to some embodiments of the disclosure. Specifically, in some embodiments, any BSR chosen according to the above equation will result in an integer number of samples (N' samples) in 1/384 ms (1001).

In embodiments where the FIG. 10 relationship, or a similar relationship, exists between the possible sample rates, then sampling clock alignment can be achieved by ensuring that contiguous transmissions at a given sample rate have a number of samples equaling an integer multiple of N'. Such a result may ensure that the contiguous transmission has a duration equal to an integer multiple of 1/384 ms 1001, and, according to FIG. 10, a clock set at another BSR has a clock edge at the end of the transmission 1021.

In some embodiments, ensuring that contiguous transmissions have a satisfactory number of samples—an integer multiple of N'—involves adding samples to the transmission. In some embodiments, samples may be added to the end of the last OFDM symbol of a frame that precedes a change in BSR. In other embodiments, extra samples can be evenly distributed among frames. Specifically, in some embodiments, a first data frame is generated, and a modified data frame is generated from the first data frame by adding a number of samples to the first data frame. When added for the purpose of sampling clock alignment, these samples may also be referred to as sampling clock alignment samples. The data frame may comprise a set of OFDM symbols.

Figure 11:
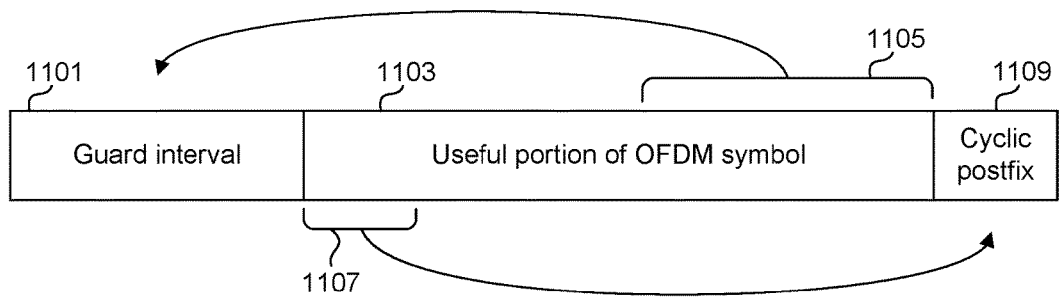
FIG. 11 illustrates the addition of additional samples to the end of an OFDM symbol according to some embodiments of the disclosure.

FIG. 11 illustrates the addition of additional samples 1109 to the end of an OFDM symbol 1100 according to some embodiments of the disclosure. Transmitting null samples at the end of a symbol 1100 may result in discontinuities between symbols, which can have undesirable effects such as spectral splatter. Instead, in some embodiments, the added samples 1109 constitute a cyclic postfix 1109, where samples 1107 from the beginning of an OFDM symbol 1100 are repeated or copied at the end of the OFDM symbol. The cyclic postfix 1109 can be formed in addition to the guard interval or cyclic prefix 1101 already existent in the OFDM symbol 1100. The cyclic postfix 1109 can serve a similar purpose as a cyclic prefix 1101, except instead of acting as a buffer for the symbol against experiencing inter-symbol interference from the previous OFDM symbol, a cyclic postfix 1109 acts as a buffer to prevent the symbol from causing inter-symbol interference to the succeeding OFDM symbol. A receiver need not decode the cyclic postfix 1109 because it is redundant to already-transmitted information. However, in some embodiments, a receiver is aware of the cyclic postfix 1109 and decodes the useful portion 1103 of the OFDM symbol 1100 based on knowledge of the existence of the cyclic postfix.

Figure 20:
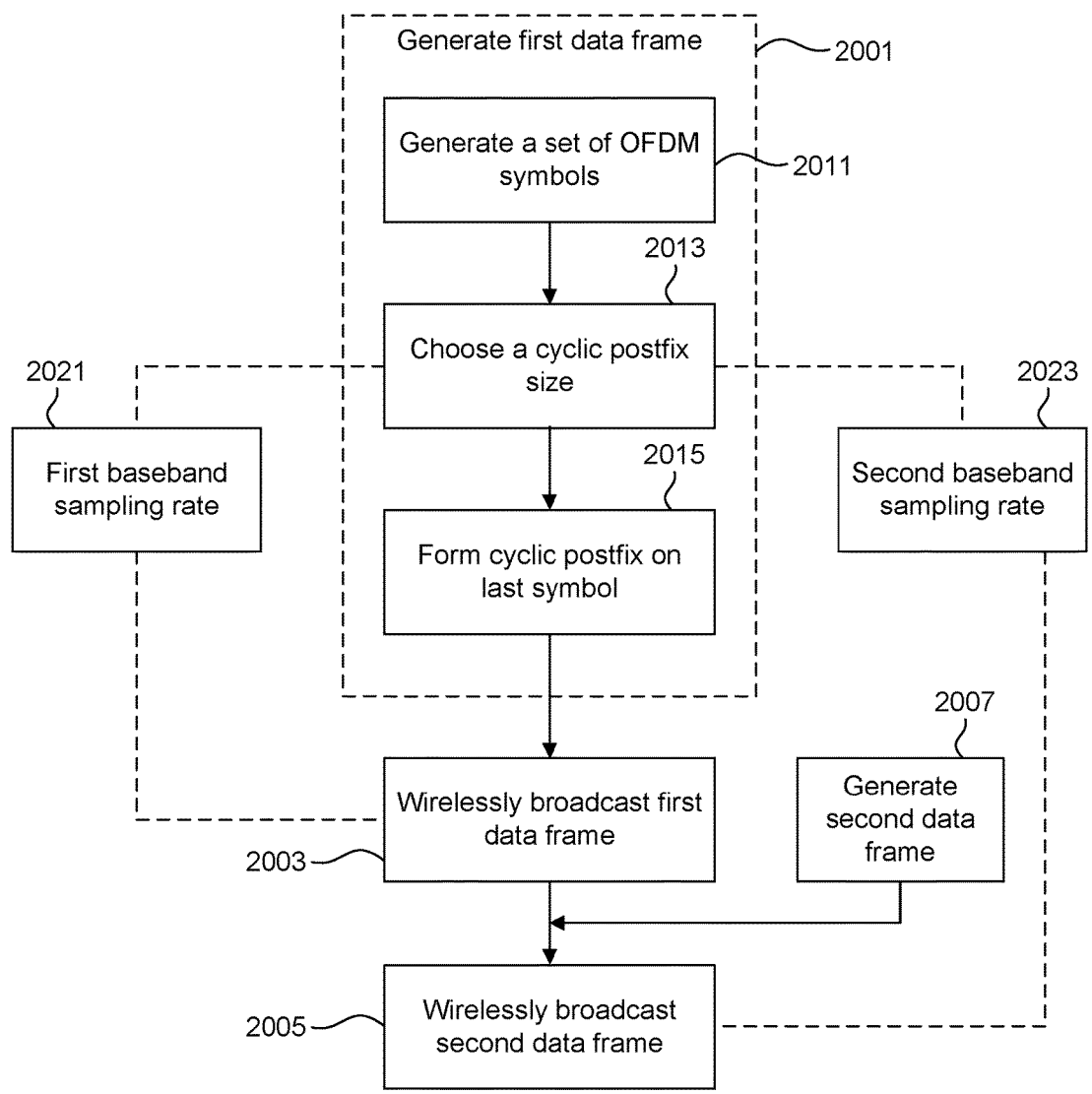
FIG. 20 is a flowchart of an exemplary method for sampling clock alignment according to some embodiments of the disclosure.

FIG. 20 is a flowchart of an exemplary method 2000 for sampling rate alignment according to some embodiments. A first data frame is generated at 2001, which may include generating a set of OFDM symbols at 2011, choosing a cyclic postfix size 2013 based on a first baseband sampling rate 2021 and a second baseband sampling rate 2023. The cyclic postfix can then be added to the last symbol of the set of OFDM symbols at 2015. The size of the cyclic postfix may be indicated by a parameter included in the first data frame. Further details on determining the size of the cyclic postfix are provided below. A second data frame is generated at 2007. At 2003, the first data frame can be wirelessly broadcast with the first baseband sampling rate 2021, and at 2005 the second data frame can be wirelessly broadcast with the second baseband sampling rate 2023. An OFDM symbol may comprise a useful portion and a cyclic prefix. Generating an OFDM symbol in the set of OFDM symbols can comprise converting a block of frequency-domain data to time-domain samples using an inverse FFT. The inverse FFT can use an FFT size equal to the size of the useful portion of the OFDM symbol to form the useful portion. The cyclic prefix can be formed by prepending to the OFDM symbol a copy of a plurality of time-domain samples from the end of the useful portion of the OFDM symbol. In addition to sampling clock alignment, network time information may be included in the first data frame as further detailed below.

Determining the Number of Samples to Add

In some embodiments, a determination is made as to how many samples to add as a cyclic postfix at the end of a frame. Referring again to FIG. 8, there may be two sampling clocks running at the receiver: Clock A at rate $BSR_A$ and Clock B at rate $BSR_B$. In some embodiments, $BSR_A=0.384 \times N'_A$ and $BSR_B=0.384 \times N'_B$. A receiver interested in the contents of the RF channel in FIG. 8 could run a sampling clock at either rate $BSR_A$ or $BSR_B$, or could run two sampling clocks at each respective rate, depending on whether the receiver wanted to receive only Type A frames, only Type B frames, or both types of frames, respectively. In FIG. 8, each time point 811-825 labeled with a letter inside a circle illustrates a time point that is synchronized with the sampling clock described in the circle.

In the illustrated embodiment, the leading edge of Frame 0 (801) is synchronized with Clock A at 811. Frame 0 (801) comprises an integer number ($M_A^0$) of samples. Each sample has a duration $T_A=1/BSR_A$, and thus, the trailing edge of Frame 0 (801) is also synchronized with Clock A at 813.

In the illustrated embodiment, the leading edge of Frame 1 (803) is synchronized with Clock B at 815. Frame 1 (803), which has a duration $T_1$ (833), comprises an integer number ($M_B^1$) of samples. Each sample has a duration $T_B=1/BSR_B$, and thus, the trailing edge of Frame 1 (803) is also synchronized with Clock B at 819. The below analysis focuses on Frame 1 (803) for simplicity, although a skilled artisan would understand that the analysis is readily applied to any of the frames 801-807 in FIG. 8.

The goal is to determine a number of samples to add to the final OFDM symbol of Frame 1 (803) such that the trailing edge of Frame 1 (803) is also synchronized with Clock A at 817. The time duration 833 of Frame 1 (803) is $T_1=M_B^1 \times T_B$ because, as described above, Frame 1 (803) comprises $M_B^1$ samples, each having a duration $T_B$. To meet the constraint that the trailing edge of Frame 1 (803) is synchronized with Clock A at 817, given that the leading edge of Frame 1 is synchronized with Clock A at 813, the duration 833 of Frame 1 (803) must be representable as $T_1=M_A^1 \times T_A$ for some integer value of $M_A^1$. Solving for the unknown variable $M_A^1$, $$M_A^1 \times T_A = M_B^1 \times T_B$$

$$M_A^1 / BSR_A = M_B^1 / BSR_B$$

$$M_A^1 / (0.384 \times N'_A) = M_B^1 / (0.384 \times N'_B)$$

$$M_A^1 = (N'_A / N'_B) \times M_B^1$$

Therefore, in some embodiments where $BSR=0.384 \times N'$, for $M_A^1$ to be an integer value, the term $(N'_A/N'_B) \times M_B^1$ must be an integer value. In some embodiments, $M_B^1$ can be set by adding samples to the end of a frame in the form of a cyclic postfix to make $(N'_A/N'_B) \times M_B^1$ an integer value. In some embodiments, the target integer value for $M_B^1$ is an integer multiple of the integer $F_B=N'_B/\gcd(N'_A, N'_B)$, where gcf(a, b) is the greatest common factor of integers a and b (i.e., the largest integer that divides evenly into both a and b). That is, in some embodiments, $M_B^1 = nF_B$ for $n \in \mathbb{Z}^+$.

Before adding any samples for the purposes of sampling clock alignment, denote that Frame 1 (803) comprises $N_{tot,B}^1$ samples. In some embodiments this value is the sum of the number of samples representing the length of the bootstrap if $BSR_B$ were used, the number of samples in the preamble, and the number of samples in the payload portion. That is, $N_{tot,B}^1 = $(#bootstrap samples using $BSR_B$)+(#preamble samples)+(#payload samples). In OFDM embodiments, the samples in any particular portion of the frame can be represented as the number of OFDM symbols in that portion multiplied by the length of an OFDM symbol, which can be the number of guard interval samples plus the number of FFT portion samples for one OFDM symbol. To formalize this relationship mathematically, it is useful to define the following terms.

$N_{BS}^j$ is the number of bootstrap symbols in Frame j.

$N_{PS}^j$ is the number of OFDM preamble symbols in Frame j.

$N_{FFT,P}^j$ is the FFT size for the OFDM preamble symbols in Frame j.

$N_{GI,P}^j$ is the guard interval length (in samples) for the OFDM preamble symbols of Frame j.

$N_{SF}^j$ is the number of subframes in Frame j.

$N_{DS,k}^j$ is the number of OFDM data symbols in the kth subframe of Frame j.

$N_{FFT,k}^j$ is the FFT size for the OFDM data symbols in the kth subframe of Frame j.

$N_{GI,k}^j$ is the guard interval length (in samples) for the OFDM data symbols of the kth subframe of Frame j.

Furthermore, in some embodiments the time duration of a bootstrap symbol is equal to 500 µs, and thus the number of samples in a bootstrap symbol at $BSR_B$ can be represented as $0.384 \times N'_B \times 500 = 192 \times N'_B$. Using these terms, $N_{tot,B}^1$ can be written as $$N_{tot,B}^1 = \begin{pmatrix} (192 N_{BS}^1 N'_B) + \\ (N_{PS}^1 (N_{FFT,P}^1 + N_{GI,P}^1)) + \\ \left( \sum_{k=0}^{N_{SF}^1 - 1} (N_{DS,k}^1 (N_{FFT,k}^1 + N_{GI,k}^1)) \right) \end{pmatrix}$$

Because in some embodiments, at least $N_{tot,B}^1$ samples are required in the frame, the target number of samples may be such that $M_B^1 \geq N_{tot,B}^1$. To minimize overhead, in some embodiments, it may be desirable to add a small number of samples for sampling clock alignment. For example, it may be desirable to minimize $M_B^1 = nF_B$ subject to the constraint that $M_B^1 \geq N_{tot,B}^1$. In some embodiments, this goal can be accomplished by setting $$M_B^1 = \lceil N_{tot,B}^1 / F_B \rceil \times F_B$$
$$= N_{tot,B}^1 + (F_B - N_{tot,B}^1 \bmod F_B) \bmod F_B$$

where $\lceil \cdot \rceil$ denotes the ceiling operation.

The number of additional samples, $N_{add,b}^1 = M_B^1 - N_{tot,B}^1 = (F_B - N_{tot,B}^1 \bmod F_B) \bmod F_B$, therefore satisfies the following inequality:

$$0 \leq N_{add,B}^1 \leq F_B - 1.$$

It can be seen that, in some embodiments, the maximum number of additional samples will occur when $F_B$ is maximum. For example, in embodiments such as ATSC 3.0 where the maximum value for $F_B$ is 96 (i.e., when $N'_B = 96$ and $\gcd(N'_A/N'_B) = 1$), the maximum possible number of additional samples will be 95. In some embodiments, the number of bits required to signal $N_{add,B}^1 = (F_B - N_{tot,B}^1 \bmod F_B) \bmod F_B$ is $\lceil \log_2 N_{add,B}^1 \rceil$, or 7 bits in the ATSC 3.0 example. Signaling is discussed below with respect to FIGS. 13 and 14.

The above analysis can be extended to transmissions having a number of consecutive frames at a given BSR. For example, as discussed above, FIG. 9 illustrates two consecutive Type B frames 903, 905. In some embodiments, only the leading clock edge 915 and trailing clock edge 921 of the Type B transmission need to be aligned with Clock A (at 913 and 919, respectively). The frame boundary 917 between Frame 1 (903) and Frame 2 (905), which are both Type B frames, does not need to be synchronized with Clock A in the illustrated embodiment. Thus, in some embodiments, the number of samples to add to the Type B transmission (e.g., to the last OFDM symbol of Frame 2 (905)) can be found by substituting $N_{tot,B}^{1,2}$ for $N_{tot,B}^1$ where $N_{tot,B}^{1,2}$ is the total number of samples in the continuous Type B transmission before sampling clock alignment. The total number of samples to add is, in some embodiments, $N_{add,B}^{1,2} = (F_B - N_{tot,B}^{1,2} \bmod F_B) \bmod F_B$ and has the same upper bound as $N_{tot,B}^1$.

In a system with more than two sampling rates, the above analysis can be generalized, in some embodiments, by assuming that the greatest common factor between the numerous sampling rates is 1, and therefore $F_B = N'_B$ and $N_{add,B}^1 = (N'_B - N_{tot,B}^1 \bmod N'_B) \bmod N'_B$. This approach has the same upper bound (e.g., 95) as the previous approach of calculating the greatest common factor.

Time Offset

Returning to FIG. 6, although in some embodiments the process of sampling clock alignment can result in additional samples in a given frame, the frame boundaries using symbol-aligned frames may still not correspond to millisecond boundaries 621, 623. The use of symbol-aligned frames 601-613 with frame boundaries that do not align with millisecond boundaries 621, 623 can complicate the ability of a transmitter to deliver the network time to receivers in networks that do so in part via physical layer signaling. Network time is defined as the total elapsed time since a particular reference time, e.g., Jan. 1, 1970 00:00:00, International Atomic Time.

The physical layer can be used to signal a portion of network time. For example, ATSC 3.0 transmits the lowest 32 bits of the seconds value of network time (i.e., the number of whole seconds since the reference time point) and a 10-bit milliseconds value giving the fractional portion of the network time. This information can be sent in a preamble, although it does not need to be sent in every preamble. In some embodiments, when present, the signaled time represents the time at which a particular reference point of the transmission occurred at the transmitter. In ATSC 3.0, for example, the reference point is considered to be the leading edge of the first time sample of the first bootstrap symbol of the frame that includes the time signal. It should therefore be appreciated that if the leading edge of the first time sample does not correspond to a millisecond boundary, then the reference point cannot be precisely signaled using the 10-bit millisecond value as done in ATSC 3.0.

Furthermore, in embodiments without sampling clock alignment, there is no limit to the precision required to signal the arbitrary frame boundaries that arise from the use of symbol-aligned frames—the frames are not guaranteed to begin at a multiple of a tenth of a millisecond, a hundredth of a millisecond, etc. Even with sampling clock alignment, sub-millisecond precision is still required. Thus, in addition to the problem of sampling clock alignment described above, a new approach is needed to precisely signal network time when using symbol-aligned frames.

Figures 12, 13:
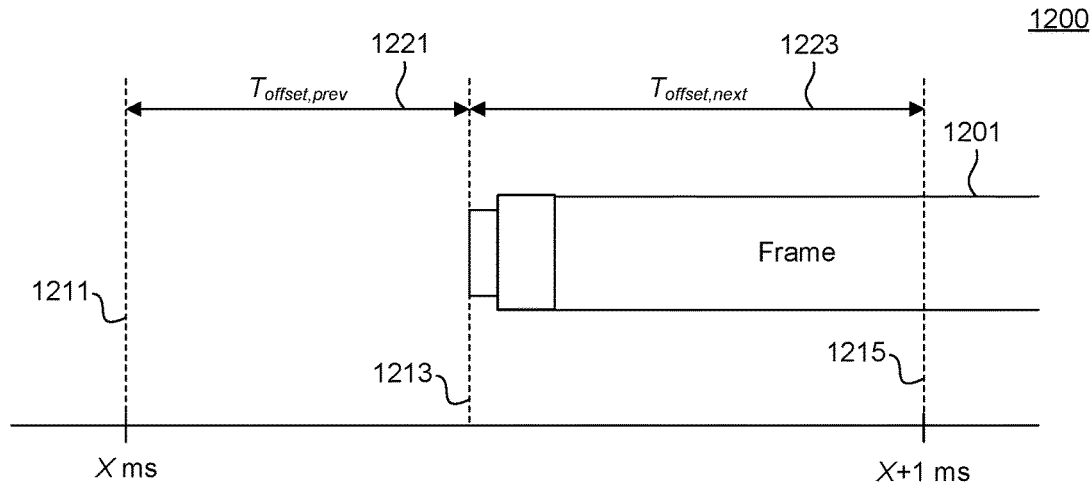
FIG. 12 illustrates time offsets of the start of a transmitted frame to the nearest millisecond boundaries according to some embodiments of the disclosure.
FIG. 13 illustrates a first example of a signaling field to support time offset and sampling clock alignment according to some embodiments of the disclosure.

FIG. 12 illustrates time offsets of the start of a transmitted frame to the nearest millisecond boundaries according to some embodiments of the disclosure. Whether or not sampling clock alignment is employed, a symbol-aligned frame 1201 may begin at some point 1213 between millisecond boundaries 1211 and 1215. The time offset 1221 from the most recent millisecond boundary 1211 is denoted as $T_{offset,prev}$, and the time offset 1223 to the next millisecond boundary 1215 is denoted as $T_{offset,next}$. Either $T_{offset,prev}$ (1221) or $T_{offset,next}$ (1223) may be signaled by the transmitter. Because $T_{offset,prev} + T_{offset,next} = 1$ ms, only one offset needs to be signaled.

Presently disclosed are two solutions to time offset signaling using symbol-aligned frames. The first solution can be applied in systems that use sampling-clock alignment and is discussed below relative to FIGS. 13-14. A second solution, Solution B, can be applied in systems that do not use sampling clock alignment, is based on prime factor expansion, and is discussed below relative to FIGS. 15-19.

Time Offset Signaling with Sampling Clock Alignment

With sampling clock alignment, symbol-aligned frames may be aligned based on fractions of a millisecond. For example, in some embodiments of symbol-aligned frames with sampling clock alignment, the resulting frames may be aligned to ⅟₃₈₄ of a millisecond. Assuming the leading edge of a frame is aligned with the sampling clock for the BSR of the frame, then both offsets $T_{offset,prev}$ (1221) and $T_{offset,next}$ (1223) of FIG. 12 are an integer multiple of $T_S$ in embodiments where the sampling clock for a BSR is aligned with the millisecond boundaries.

The maximum number of samples in one millisecond occurs when the largest valid BSR is used. In some embodiments, such as in ATSC 3.0, the largest BSR is 36.864 MHz, and at this BSR there are 36,864 samples in one millisecond. Therefore, in some embodiments, the number of bits required to signal the time offset is $\lceil \log_2 36864 \rceil = 16$ bits. In some embodiments, as discussed above, 7 bits may be required to signal the number of added samples for sampling clock alignment.

FIG. 13 illustrates a first example of a signaling field to support 16 bits to signal time offset and 7 bits to signal sampling clock alignment according to some embodiments of the disclosure. In the illustrated embodiment, the syntax adopts the ATSC 3.0 syntax. For example, the signals can be part of the L1_Basic_signaling structure described in drafts of the ATSC 3.0 A/322 Physical Layer Protocol. In the illustrated embodiment, the 1-bit parameter L1B_frame_length_mode may denote whether the frame is time-aligned (L1 B_frame_length_mode=0) or symbol-aligned (L1B_frame_length_mode=1). In the former case of time-aligned frames (1301), the signaling can use 10 bits to signal L1B_frame_length 1321 and 13 bits to signal L1B_excess_samples_per_symbol 1323, for a total of 23 bits. In the latter case of symbol-aligned frames (1303), the same 23 bits can be used to signal the time offset and additional samples. That is, some embodiments include a 16-bit parameter L1B_time_offset 1311 and a 7-bit parameter L1B_additional_samples 1313.

FIG. 14 illustrates a second example of a signaling field to support time offset and sampling clock alignment according to some embodiments of the disclosure. In the illustrated embodiment 1400, the signals can again be part of the L1_Basic_signaling structure. In the illustrated embodiment, the 1-bit parameter L1B_frame_length_mode may denote whether the frame is time-aligned (L1B_frame_length_mode=0) or symbol-aligned (L1B_frame_length_mode=1). In the former case of time-aligned frames (1401), the signaling can use 10 bits to signal L1B_frame_length 1421 and 13 bits to signal L1B_First_Sub_excess_samples 1423, for a total of 23 bits. In the latter case of symbol-aligned frames (1403), the same 23 bits can be used to signal the time offset and additional samples. In some embodiments, the time offset signal can be split into two portions, a 10-bit L1B_time_offset_msb 1411 and a 6-bit L1B_time_offset_lsb 1413. In addition, the signaling may include a 7-bit parameter L1B_additional_samples 1415.

Time Offset Signaling Using Prime Factor Expansion

Signaling time offset in symbol-aligned transmissions without sampling clock alignment requires a greater degree of precision because in such transmissions sampling clocks may not be assumed to be synchronized at frame boundaries. In some embodiments, the number of possible BSRs may be limited to simplify the problem. This can be done by prime factorization.

For a given BSR, the time length of each time sample is $T_S=1/BSR$. The number of samples in each bootstrap symbol is, in some embodiments consistent with ATSC 3.0, 3072, which is evenly divisible by 64. The number of samples in each preamble or subframe OFDM symbol can also be an integer multiple of 64 in some embodiments. For example, in ATSC 3.0, each possible FFT size (8192, 16384, or 32768) is evenly divisible by 64, as is each possible guard interval length. This implies that every OFDM symbol in the preamble and payload portions of a frame can have a duration that is an integer multiple of $64 \times T_S$.

A goal of time offset signaling using prime factorization is to determine a basic time unit $T_{basic}$ that divides evenly into a range of values of $64 \times T_S$ for different $T_S$ and which would therefore be applicable to a number of different BSRs. FIG. 15 illustrates the prime factors of the integers ranging from 16 to 96. These integers correspond to the possible values for the parameter N' in ATSC 3.0. It may be desirable to select a set of prime factors that allow a reasonable subset of the values of N' in FIG. 15 to be represented. In some embodiments, the following two values ($M_1$ and $M_2$) are defined as products of a set of prime factors, although it should be appreciated that additional $M_i$ values could also be possible using different sets of prime factors.

$$M_1=2^5 \times 3^2 \times 5 \times 7=10,080$$

$$M_2=2^6 \times 3^2 \times 5^2 \times 7 \times 11=1,108,800$$

FIG. 16 illustrates which values of N' can be represented using a subset of the prime factors used for each of $M_1$ and $M_2$. As can be seen, not every value of N' is included, but a reasonable subset of the values of N' with a roughly even distribution across the entire range has been achieved. A basic timing unit can be defined $T_{basic,i}=64/(M_i \times 0.384)$ μs. For $M_1$, $T_{basic,1}=25/1512$ μs≈0.016534 μs, and one millisecond corresponds to $60,480 \times T_{basic,1}$. Therefore, $\lceil \log_2 60,480 \rceil=16$ bits can be used to signal the number of $T_{basic,1}$ time units to cover a time range of 1 ms. For $M_2$, $T_{basic,2}=5/33264$ μs≈0.00015031 μs and one millisecond corresponds to $6,652,800 \times T_{basic,2}$. Therefore, $\lceil \log_2 6,652,800 \rceil=23$ bits can be used to signal the number of $T_{basic,2}$ time units to cover a time range of 1 ms.

FIG. 17 lists the values of N' that can be represented using a subset of the prime factors of $M_1$, together with the corresponding BSR and sample time for each listed value of N'. It should be appreciated that for this subset of values of N', $64 \times T_S$ can be represented using an integer multiple of $T_{basic,1}$. For example, when N'=18 and BSR=6.912 MHz, the time length of $64 \times T_S$ is equal to $560 \times T_{basic,1}$. This implies that the overall physical layer frame length for each of these configured BSRs can be represented as an integer multiple of $T_{basic,1}$.

FIG. 18 lists the values of N' that can be represented using a subset of the prime factors of $M_2$, together with the corresponding BSR and sample time for each listed value of N'. The final column of the table computes the number of basic timing units ($T_{basic,2}$) that are needed to equal $64 \times T_S$ for each listed value of N'. It should be appreciated that, for this subset of values of N', $64 \times T_S$ can be represented using an integer multiple of $T_{basic,2}$. This implies that the overall physical layer frame length for each of these configured BSRs can be represented as an integer multiple of $T_{basic,2}$.

Referring back to FIG. 12, the time offset can be signaled using $T_{basic,1}$ or $T_{basic,2}$ as a basic time unit. Provided that the configured BSR is one of those listed in either FIG. 17 or FIG. 18, respectively, either of the offsets in FIG. 12 can be represented as an integer multiple of $T_{basic,1}$ or $T_{basic,2}$, respectively. If $T_{basic,1}$ is used as the basic time unit, then 16 signaling bits can be used to signal a time offset within a 1 ms range as calculated above. If $T_{basic,2}$ is used as the basic time unit, then 23 signaling bits can be used for signaling a time offset within a 1 ms range as calculated above.

FIG. 19 shows the L1-Basic signaling fields to support the signaling of a time offset value without sampling clock alignment. The two fields L1B_frame_length (1921) and L1B_First_Sub_excess_samples (1923) are used when time-aligned physical layer frames are used (1901) (i.e., when L1B_frame_length_mode=0). When symbol-aligned frames are configured (1903), these two signaling fields can be repurposed to carry the time offset value. The 10 bits used to carry L1B_frame_length (1921) for time-aligned frames can carry the 10 least significant bits for the time offset value (1911). The 13 bits used to carry L1B_First_Sub_excess_samples (1923) for time-aligned frames can carry the Y most significant bits for the time offset value (1913) and the 13−Y unused bits (1915) (which can be set to a fixed value such as 1), where Y=6 if the time offset is signaled in units of $T_{basic,1}$ or Y=13 if the time offset is signaled in units of $T_{basic,2}$. In some embodiments, the full time offset value (L1B_time_offset) can be recovered by concatenating the most significant bits (L1B_time_offset_msb 1913) and the least significant bits (L1B_time_offset_lsb 1911) together.

The network time sent by the transmitter can represent either the nearest millisecond boundary 1211 preceding the leading edge 1213 of the frame 1201 or the nearest millisecond boundary 1215 following the leading edge 1213 of the frame 1201. In the former case, L1B_time_offset would correspond to $T_{offset,prev}$ (1221) in FIG. 12, and in the latter case, L1B_time_offset would correspond to $T_{offset,next}$ (1223) in FIG. 12.

It is to be appreciated that embodiments of the disclosure can be implemented by a broadcast system having any combination of hardware, software, or firmware. A broadcast system can include, but is not limited to, a device having a processor and memory, including a non-transitory memory, for executing and storing instructions. A processor can include circuits configured to carry out logic and/or instructions to perform arithmetical, logical, and/or input/output (I/O) operations of the broadcast system and/or one or more components of the broadcast system. Examples of such circuits include field-programmable gate arrays (FPGAs), application-specific integrated circuits (ASICs), digital signal processors (DSPs), and general-purpose processors (GPPs). The memory may tangibly embody the data and program instructions. Software may include one or more applications and an operating system. Hardware can include, but is not limited to, a radio frequency (RF) transmitter including an RF front-end, an antenna, a processor, and a memory. The broadcast system may also have multiple processors and multiple shared or separate memory components.

It is to be appreciated that the Detailed Description section, and not the Summary and Abstract sections, is intended to be used to interpret the claims. The Summary and Abstract sections may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method, comprising:
   generating a first data frame with a first baseband sampling rate;
   generating a second data frame with a second baseband sampling rate; and
   wirelessly broadcasting the first data frame and the second data frame on a same radio frequency (RF) channel,
   wherein generating the first data frame comprises generating a set of orthogonal frequency division multiplexing (OFDM) symbols, the set of OFDM symbols comprising at least a first OFDM symbol and a last OFDM symbol,
   wherein each OFDM symbol of the set of OFDM symbols comprises a useful portion and a cyclic prefix,
   wherein generating said each OFDM symbol comprises:
      converting a block of frequency-domain data to time-domain samples using an inverse fast Fourier transform having a transform size to form the useful portion; and
      forming the cyclic prefix by prepending to said each OFDM symbol a copy of a plurality of time-domain samples from an end of the useful portion of the OFDM symbol,
   wherein the last OFDM symbol of the set of OFDM symbols comprises a cyclic postfix,
   wherein generating the last OFDM symbol further comprises forming the cyclic postfix by appending to the last OFDM symbol a copy of at least one time-domain sample from a beginning of the useful portion of the OFDM symbol, and
   wherein a size of the cyclic postfix is chosen based at least in part upon the first baseband sampling rate and the second baseband sampling rate, and
   wherein the first data frame comprises a time offset between a millisecond boundary and a beginning time for the wirelessly broadcasting of the first data frame.

2. The method of claim 1, wherein the first data frame comprises a parameter indicating the size of the cyclic postfix.

3. The method of claim 1, wherein the size of the cyclic postfix is less than 96 samples.

4. The method of claim 1, wherein the first and second data frames are Advanced Television Systems Committee (ATSC) 3.0 frames and the millisecond boundary is based on an external time standard.

5. The method of claim 1, wherein the millisecond boundary is after the beginning time for the wirelessly broadcasting of the first data frame.

6. The method of claim 1, wherein the millisecond boundary is before the beginning time for the wirelessly broadcasting of the first data frame.

7. An apparatus, comprising:
   a processor configured to:
      generate a first data frame comprising an initial number of samples at a first baseband sampling rate;
      generate a second data frame having a second baseband sampling rate;

determine an additional number of samples at the first baseband sampling rate such that, when the additional number of samples are added to the first data frame to form a modified data frame, a duration of the modified data frame is representable as an integer number of samples at the second baseband sampling rate;

add the additional number of samples to the first data frame to form the modified data frame;

a transmitter configured to wirelessly broadcast the modified data frame and the second data frame on a same radio frequency (RF) channel, wherein the modified data frame comprises a time offset between a millisecond boundary and a beginning time of the wireless broadcast of the modified data frame.

8. The apparatus of claim 7, wherein the first data frame comprises a set of orthogonal frequency division multiplexing (OFDM) symbols.

9. The apparatus of claim 8, wherein to add the additional number of samples to the first data frame, the processor is further configured to add a cyclic postfix to an OFDM symbol in the set of OFDM symbols.

10. The apparatus of claim 9, wherein to add the cyclic postfix to the OFDM symbol in the set of OFDM symbols, the processor is further configured to add the cyclic postfix to a last OFDM symbol to be transmitted in the first data frame.

11. The apparatus of claim 7, wherein the modified data frame further comprises information indicating the additional number of samples added to the first data frame to form the modified data frame.

12. The apparatus of claim 7, wherein the millisecond boundary is after the beginning time of the wireless broadcast of the modified data frame.

13. The apparatus of claim 7, wherein the millisecond boundary is before the beginning time of the wireless broadcast of the modified data frame.

14. An apparatus, comprising:
a first clock operating at a first baseband sampling rate;
a second clock operating at a second baseband sampling rate;
a receiver configured to receive, on a same radio frequency (RF) channel, a first data frame at the first baseband sampling rate and a second data frame at the second baseband sampling rate, wherein the first data frame comprises a preamble portion and a payload portion; and
a processor configured to:
determine, from the preamble portion of the first data frame, a number of sampling clock alignment samples present in the payload portion of the first data frame; and
process the payload portion of the first data frame based at least in part on the determined number of the sampling clock alignment samples,
wherein the first data frame further comprises a time offset between a millisecond boundary and a beginning time of a wireless broadcast of the first data frame.

15. The apparatus of claim 14, wherein the first data frame further comprises a set of orthogonal frequency division multiplexing (OFDM) symbols.

16. The apparatus of claim 15, wherein the sampling clock alignment samples form a cyclic postfix to an OFDM symbol in the set of OFDM symbols.

17. The apparatus of claim 14, wherein the first and second data frames are Advanced Television Systems Committee (ATSC) 3.0 frames and the millisecond boundary is based on an external time standard.

18. The apparatus of claim 17, wherein the millisecond boundary is before the beginning time of the wireless broadcast of the first data frame or the millisecond boundary is after the beginning time of the wireless broadcast of the first data frame.

19. The apparatus of claim 14, wherein the preamble portion of the first data frame comprises:
a first parameter indicating the number of the sampling clock alignment samples present in the payload portion of the first data frame; and
a second parameter indicating the time offset.

* * * * *